(12) United States Patent
Franke et al.

(10) Patent No.: US 6,233,527 B1
(45) Date of Patent: May 15, 2001

(54) SYSTEM FOR MONITORING UNITS EXCITED BY OSCILLATIONS

(75) Inventors: Dieter Franke; Steffen Bühler; Martin Weichselbaumer, all of Wie Postanschrift (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 09/125,046

(22) PCT Filed: Dec. 12, 1996

(86) PCT No.: PCT/EP96/05567

§ 371 Date: Feb. 17, 1999

§ 102(e) Date: Feb. 17, 1999

(87) PCT Pub. No.: WO98/28599

PCT Pub. Date: Jul. 2, 1998

(51) Int. Cl.[7] ....................................................... G06F 15/00
(52) U.S. Cl. ........................... 702/56; 702/182; 702/187; 73/579; 235/375
(58) Field of Search ............................. 702/56, 182, 185, 702/187; 73/579, 660, 661; 235/375, 376

(56) References Cited

U.S. PATENT DOCUMENTS

| 4,520,674 | 6/1985 | Canada et al. | 702/56 |
|---|---|---|---|
| 4,612,620 | 9/1986 | Davis et al. | 702/184 |
| 4,651,291 | * 3/1987 | Nishimura | 702/162 |
| 4,800,512 | * 1/1989 | Busch | 702/182 |
| 4,885,707 | * 12/1989 | Nichel et al. | 702/56 |
| 5,142,128 | * 8/1992 | Perkin et al. | 235/375 |
| 5,309,351 | * 5/1994 | McCain et al. | 702/185 |
| 5,602,761 | * 2/1997 | Spoerre et al. | 702/183 |
| 5,956,658 | * 9/1999 | McMahon | 702/182 |

FOREIGN PATENT DOCUMENTS

| 0 002 232 | 6/1979 | (EP) . |
|---|---|---|
| 0 230 712 | 8/1987 | (EP) . |
| 95 08806 | 3/1995 | (WO) . |

* cited by examiner

Primary Examiner—Marc S. Hoff
Assistant Examiner—Bryan Bui
(74) Attorney, Agent, or Firm—Nixon Peabody LLP; David S. Safran

(57) ABSTRACT

A system for monitoring units excited by oscillations, having a computer-controlled central processing unit and a computer-controlled, transportable measuring apparatus. The measuring apparatus is programmed by the central processing unit, by way of a data transmission, with at least some measuring points which can be inspected in a prescribable time period within prescribable time limits from a total number of measuring points assigned to the units. The measuring points are automatically displayed in the measuring apparatus and are processed using the measuring apparatus, in order to execute a measuring task determined by the central processing unit. After ending the route, the measuring apparatus transmits the measured data to the central processing unit by way of a data transmission. The central processing unit has an evaluator and/or display for the measured data. In the central processing unit, for each of the measuring points, at least one standard measuring task and at least one extended measuring task is stored. These are loaded into the measuring apparatus according to the selected route. Only the standard measuring task is carried out at the measuring points and at least one of the extended measuring tasks is automatically displayed and carried out at the relevant measuring point as a function of the occurrence of a registrable event which can be assigned to the unit having the measuring point. The measurement results of the standard and extended measurements carried out are transferred into the central processing unit and evaluated.

22 Claims, 2 Drawing Sheets

SYSTEM FOR MONITORING UNITS EXCITED BY OSCILLATIONS

BACKGROUND OF THE INVENTION

Field of the Invention

The invention relates to a system for monitoring units excited by oscillations, having the features stated in the preamble of claim 1.

It is known from U.S. Pat. No. 4,612,620 to monitor units excited by oscillations by means of a so-called route. For the purposes of the present description, units excited by oscillations are understood to mean one or more machines, production installations, auxiliary devices, components or other installations of any kind which are to be regarded in a certain association with one another, for example that they all belong to one and the same plant. The route comprises defined measuring points being allocated a measuring task in a specific sequence within a specific period of time at the units. For this purpose, a portable measuring apparatus is provided, having operator-control elements, memories, microprocessors and a display. Measuring tasks relevant for each ofthe possible measuring points can be stored with associated, suitable measurement settings in this measuring apparatus via a higher-level computer (central processing unit). Consequently, a specific measurement, for example frequency analyses of oscillations etc., can be carried out at each measuring point by means of this portable measuring apparatus. The measurement results thus obtained are stored in the portable measuring apparatus. Once the route has been patrolled, the portable measuring apparatus can be connected again to the higher-level computer, whereupon an evaluation of all the stored measurement results of all the measuring points allocated a measuring task takes place.

Consequently, it is a principal characteristic of the route that the measuring tasks are stored in the sequence of later processing in the central processing unit and that this sequence is transmitted to the measuring apparatus, so that the measuring tasks are automatically displayed in the prescribed sequence in the measuring apparatus.

It is known to use as measuring tasks the measuring of individual measured variables for an assessment of the state of the unit having the measurng points. These individual measured variables are not specific to the respective measuring points, but are regularly recorded according to the route laid down and, after transferring the measurement results into the central processing unit, are supplied with regard to a trend in the development of the measurement results and/or to a threshold-value comparison. Since, as is known, an actual identification of the cause of an error can only take place by means of a signal measurement, preferably with specialists being able to assign specific lines in recorded frequency spectra to specific causes of error in the evaluation. To carry out these signal measurements, a second patrol of the route is required, in order that the signal measurements can be carried out at those measuring points determined with the first patrol of the route at which the evaluation of the individual measured variables which have been measured indicates that a threshold value had been exceeded. To be able to carry out this second patrol of the route, a listing of specific measurement settings of the signal measurements by a specialist is required, either at the central processing unit or in situ, at the respective measuring point on the measuring apparatus.

A further known route comprises carrying out complete signal measurements at each selected measuring point of the route, without an assessment of the state of this measuring point having taken place beforehand using an individual measured variable. Since the signal measurements for monitoring units excited by oscillations, for example a frequency analysis, are relatively complicated, the measuring apparatus must have a correspondingly great capacity. In particular, there must be sufficient storage space for storing the measuring tasks, the measuring programs and the measurement results; what is more, a relatively complex software package must be kept for the proper processing of these points.

SUMMARY OF THE INVENTION

The invention is therefore based on the object of specifying a system of the generic type which does not have these disadvantages.

This object is achieved according to the invention by a system having the features stated in claim 1. The fact that in the central processing unit there is stored for each of the measuring points a standard measuring task and at least one extended measuring task, which are loaded into the measuring apparatus according to the selected route, only the standard measuring task being carried out at the measuring points and at least one of the extended measuring tasks being automatically displayed and carried out at the relevant measuring point as a function of the occurrence of a registrable event which can be assigned to the unit having the measuring point, and the fact that the measurement results of the standard and extended measurements carried out are transferred into the central processing unit and evaluated there, make it advantageously possible to defme in advance for each measuring point an at least two-stage error profile, with which the measuring apparatus is activated according to the measuring points located on the route laid down, the error profiles comprising a simple classification of the measurement results to prescribed categories, an alarm signal being generated if a defined category is exceeded within the error profile and the at least one extended measuring task, preferably a signal measuring task, only then being automatically carried out for this measuring point.

It is possible to permit operator control which does not require a specially trained specialist. In particular by virtue of the division into at least two-stage measurement, the first measurement preferably merely comprising the recording of a simple individual characteristic value, handling is very simple. Only when, within this individual characteristic value, there is recorded at the measuring point a signal which falls into a predefined category which is not to be exceeded is the alarm signal triggered, so that the operator perceives acoustically and/or visually that there is possibly an error at this measuring point. This message at the same time initiates an actual analysis of the measuring point with the measurement at the higher stage, that is to say the at least one signal measurement stored in the measuring apparatus for this actual measuring point takes place.

In a preferred development of the invention it is provided that, in the measurement of the individual characteristic value within the standard measurement, at least one threshold value, preferably three threshold values, are stored for each individual characteristic value for the automatic identification of an error or of a deterioration in state. Consequently, the division of the measured individual characteristic values takes place into four categories, which are respectively separated by the threshold values and respectively correspond to an error profile.

Altogether, the system according to the invention provides simple operator control for a measuring apparatus and the processing or evaluation of the route in the central processing unit, so that a specialist only has to be kept on standby, that is to say only need be used in an acute case. As a result, there is a saving in qualified expert personnel, since the latter no longer has to carry out the routine processing of the predefined route, since experience shows that there is no error message at the vast majority of measuring points. At the same time, the storage capacity of the measuring apparatus and the storage capacity of the central processing unit can be kept smaller, since the signal measuring tasks are processed, and corresponding results have to be stored, only in an acute case. Finally, the route has to be patrolled only once in order to carry out the standard measurement and, if appropriate, an extended measurement (signal measurement).

Furthermore, in a preferred development of the invention it is provided that the at least one standard measuring task and/or the at least one extended measuring task, as specific, typifiable, tailor-made measuring tasks, are assigned to the same or same type of machine parts with measuring points. As a result, it is advantageously possible for processing the route within a plant within which a plurality of different units may have the same or the same type of machine parts to specify for these same or same type of machine parts respectively specific, typifiable, tailor-made measuring tasks, in order to carry out reliably the identification of their state by means of the standard measurement and/or carry out reliably the identification of causes of error by means of the extended measurement, in order to obtain registrable events reliably. For the same or same type of typical machine parts, fixed data, typified forms of representation, assessment algorithms and the assignment of standard measuring tasks and/or extended measuring tasks to the measuring points of the machine parts can also be stored in the central processing unit for simple and reliable creation of the routes.

In a preferred development of the invention it is provided that, in addition to the intended route of a plant or of a plant part, a pool of all the measuring points known in the central processing unit of the monitored, oscillation-excited units and/or machine parts of the units of a plant (factory) is created in the background of the measuring apparatus, so that the route patroller processing the route actually laid down can, if required, also process measuring points with a measuing task, at least as a standard measuring task, which are not predefined on the route. This makes it possible whenever evident irregularities, only discovered during the patrol of the route, occur on a specific machine or machine part for an inspection also to be carried out there.

Furthermore, it is preferred if, instead of the measurement of an individual characteristic value, the standard measuring task comprises the measurement of a signal or of a signal portion. What is more, instead of the measurement of a signal characteristic, the extended measuring task may preferably comprise the measurement of an individual characteristic value. Consequently, tailor-made routes specific to the existing measuring points on the units, or on the components of units, are obtained and can be prescribed by the central processing unit. Depending on the unit, or component of units, it can thus be decided whether a more optimum processing of the standard measuring task is possible using an individual characteristic value or using a signal. It likewise applies for the extended measuring task that, depending on the specific unit, or components of the unit, having the measuring point, the extended measuring task can be optimized by prescribing for example a signal characteristic value or an individual characteristic value as the extended measuring task.

What is more, in a further preferred development of the invention it is provided that, if there is no occurrence of a registrable event at a first of a plurality of measuring points assigned to a unit and/or machine part of a unit, the at least one standard measuring task is skipped at the further measuring points assigned to this unit and/or machine part. This makes further simplification of the route possible. The fact that already no registrable event indicating the occurrence of an error has been established at a first measuring point, which is for example a main measuring point of a unit and/or of a machine part, allows the conclusion to be drawn that likewise no registrable event is to be expected at the other measuring points, for example secondary measuring points, of the same unit and/or same machine part. The carrying out, or patrol, of the route is simplified, or shortened, as a result.

Furthermore, it is preferred if at the first of a plurality of measuring points the at least one standard measuring task is automatically displayed and carried out for the other measuring points. This makes it advantageously possible for the measuring apparatus to be docked once only onto the first, main measuring point of a unit and/or machine part of the unit and thereby to carry out all the standard measuring tasks for the other measuring points of this unit and/or machine part. Only if a registrable event occurs is it automatically displayed at which of the other measuring points, at most all of them, at least one standard measuring task has to be repeated, or at least an extended measuring task has to be carried out there. Optimizations of the route carried out are thus obtained overall in a simple way.

Further advantageous developments of the invention emerge from the other features stated in the subclaims.

BRIEF DESCRIPTION OF THE DRAWINGS

The invention is explained in more detail below in exemplary embodiments with reference to the associated drawings, in which.

DETAILED DESCRIPTION OF THE INVENTION

Figure 1:
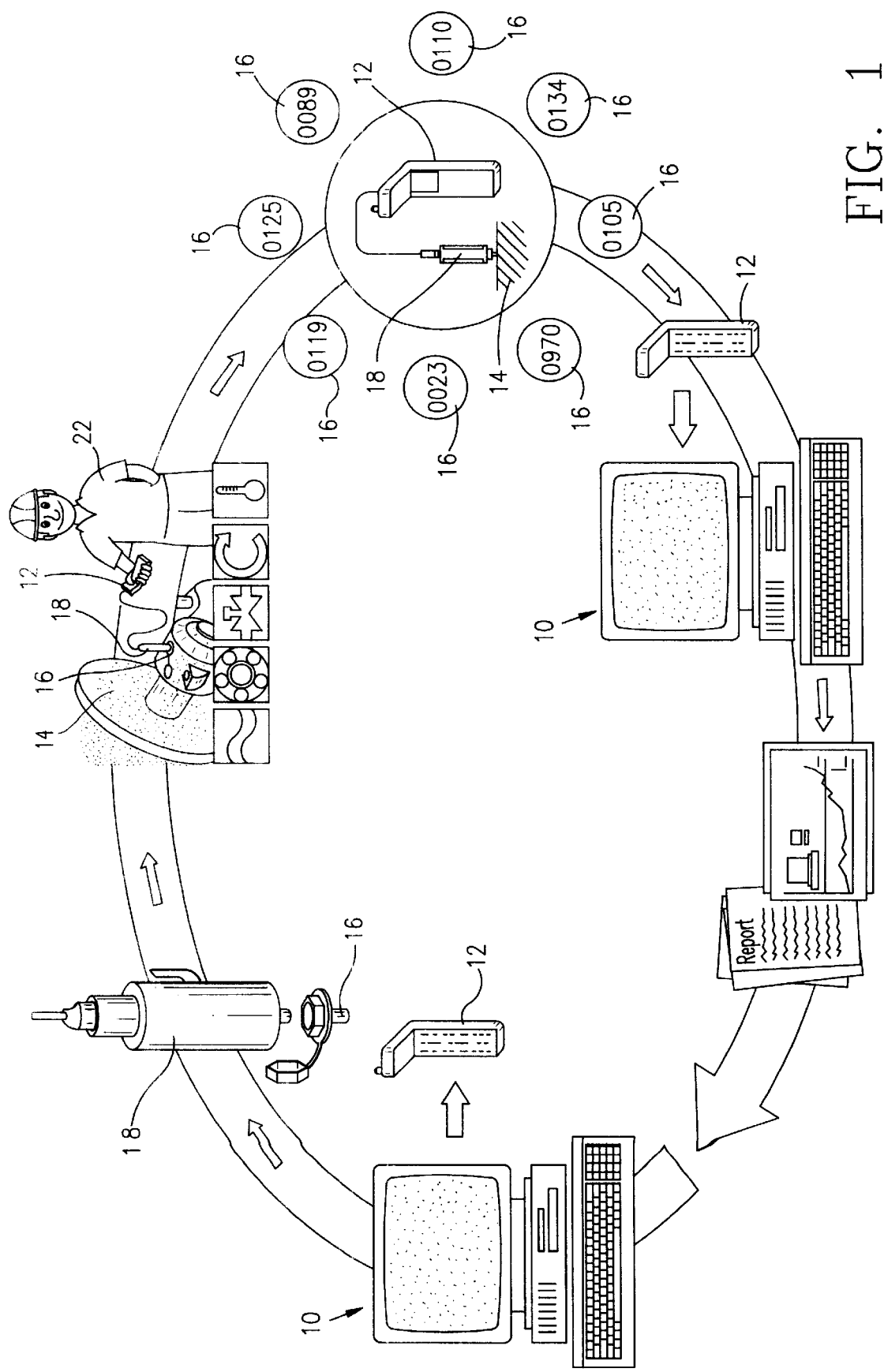
FIG. 1 shows a block diagram of the system according to the invention.

FIG. 1 shows the system in ablock diagram, to which the invention relates. The system comprises a computer-controlled central processing unit 10 and a computer-controlled, transportable measuring apparatus 12. Furthermore, the system comprises units 14 excited by oscillations, of which only one is shown in FIG. 1. A unit is understood to mean an entire machine, which may be subdivided into individual machines, and which comprises machine parts to be monitored. The units 14 have at least one measuring point 16, to which the measuring apparatus 12 can be connected by means of a tansmission link 18. For this purpose, the transmission link 18 may have an interface, which can be connected to an interface of the measuring apparatus 12 by a transmission cable 20.

The system has the following function:

A route is loaded into the measuring apparatus 12 by means of the central processing unit 10. The route comprises a specific selectable number of actual measuring points 16 of the selected units 14. In the example, eight measuring points 16 are assumed. These may either be measuring points 16 which are all available or else a selection of measuring points 16. For each of the measuring points 16 selected on the route, the measuring apparatus 12 is loaded with a standard measuring task and at least one extended measuring task, also referred to in the following as the signal measuring task, as is to be explained in still more detail with reference to FIG. 2. Standard measuring tasks are preferably the determination of individual characteristic values which serve for identifying the state of a machine part using a simple threshold value comparison. Signal measuring tasks are preferably signal measurements which serve for identifying causes when there are deteriorations in state. The identification of causes takes place using frequency-selective error profiles, that is to say the amplitudes of specific frequency components (lines or bands) are in turn treated like individual characteristic values, but for a specific type of error or cause of error in each case. To assign specific standard measuring tasks and extended measuring tasks, they are assigned to the measuring points 16 on units (machine parts) 14, since the measuring settings mainly depend on the type of machine part (for example shaft oscillation, severity of machine vibration at the bearing housing, rolling-contact bearing), but also on the type of unit and the rotational speed. Similarly, specific signal measuring tasks are assigned to these specific machine parts. For example, the level of a single specific frequency bond from the overall frequency characteristic of the signal may be the individual characteristic value of the standard measuring task which, with registrable events, leads to extended measuring tasks, which may be the same, but complete, frequency characteristic.

A route patroller 22 subsequently patrols, with the measuring apparatus 12, the route, prescribed by the central processing unit 10, of the measuring points 16 to be inspected. When doing so, the measuring apparatus 12 is coupled to the measuring point 16 by the transmission link 18 and the standard measuring task prescribed for this measuring point 16 is processed. If no registrable event occurs, which is likewise to be explained in still more detail with reference to FIG. 2, a standard measurement result is assigned in the measuring apparatus to the measuring point 16 applicable at that particular time and is stored. This ends the measurement at this measuring point 16.

If a registrable event occurs during the standard measurement, this can be visually and/or acoustically displayed to the route patroller 22 on the measuring apparatus 12. Then, at least one extended measuring task (signal measuring task) envisaged here can be processed at this measuring point 16, since this task is automatically displayed for carrying out as an extended measuring task on the route, the measurement results of which are likewise stored in the measuring apparatus 12.

According to the route laid down, all the measuring points 16 of a route are processed by the route patroller 22. After ending the route, the measurement results of the standard measurements, and if appropriate of signal measurements, stored in the measuring apparatus 12 are supplied to the central processing unit 10 by means of data transmission. The central processing unit 10 evaluates the standard measurement results as a long-term trend and evaluates the signal measurement results over a time and/or frequency characteristic and produces listings which can be evaluated, for example in the form of printouts or on a screen for an evaluating specialist. On the basis of these evaluations, it can be decided whether certain parts and/or entire units 14 have to be repaired or exchanged on account of malfunctions which have occurred.

The division into standard measuring tasks and signal measuring tasks, which are only to be carried out if need be, for each measuring point 16 of the route to be carried out has the overall effect of automatically adapting the number and complexity of the signal measurements according to the state of the oscillation-excited units 14 to be monitored on the route. In the event that no registrable events occur within the standard measurements, the effort involved in carrying out, storing and evaluating the signal measurements is drastically reduced. Carrying out the measurements on the route consequently becomes easier and clearer overall, without adversely affecting the quality of the monitoring of the units excited by oscillations.

Figure 2:
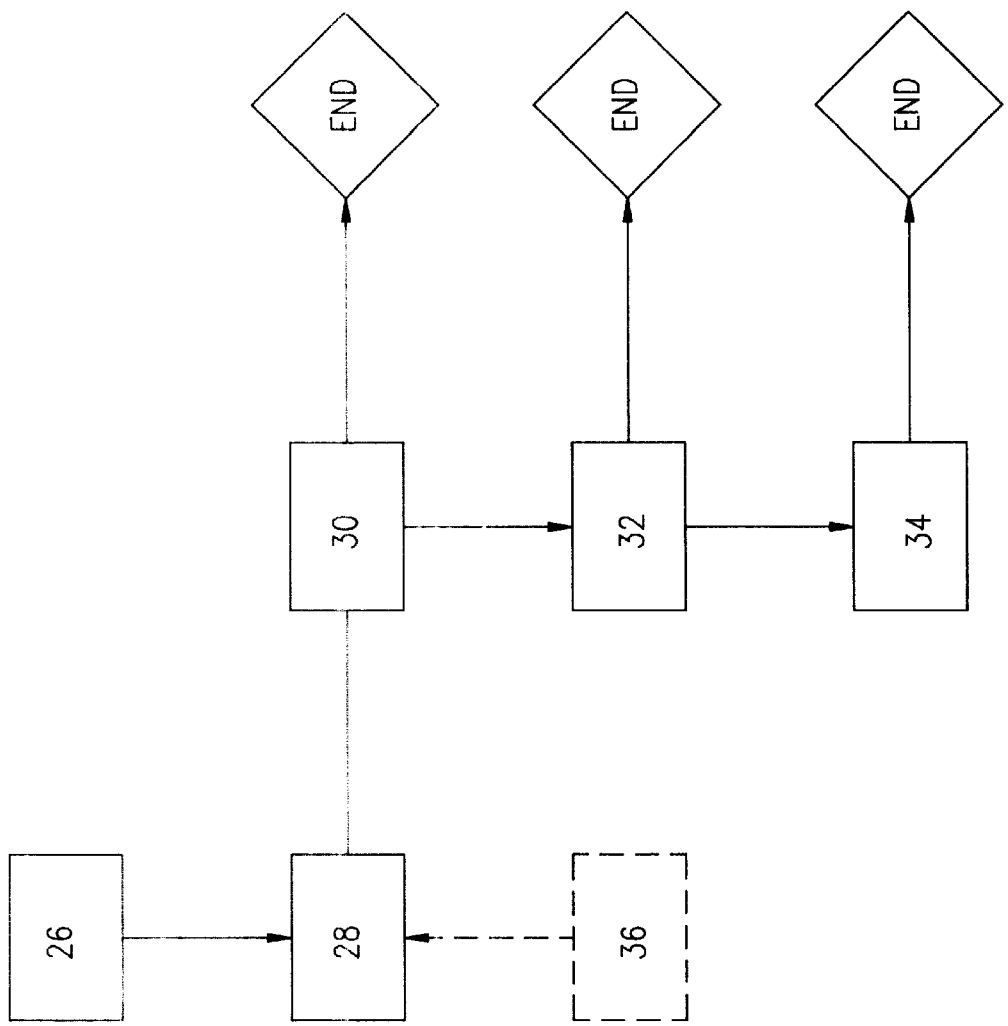
FIG. 2 shows a flowchart of a measurement at a measuring point of the route.

FIG. 2 illustrates in a flowchart the carrying out of the measurement at a measuring point 16 of the route. It is clear that the measurement explained here for one measuring point 16 applies of course to all the measurng points 16 of the route.

The measuring apparatus 12, loaded with the route, is connected to the measuring point 16 in a first step 26. Subsequently, in a next step 28, the carrying out of the standard measuring task takes place. The standard measuring task comprises the measurement of an individual characteristic value. For the automatic assessment of the measurement results, or for the identification of a deterioration in state, the individual characteristic value to be measured is assigned for example three threshold values, which divide the measurement results theoretically to be expected for the individual characteristic value into categories, four categories in the case of three threshold values, which are respectively separated by the threshold values. The individual characteristic values of one category are combined to form an error profile. At least one of the threshold values forms an alarm threshold. According to an actual example, the individual characteristic value to be measured may assume a value from 0 to 9 of a display. Defined within these values 0 to 9 there are threshold values, which may lie for example at the values 2,4 and 6. Consequently, an assignment is possible of the individual characteristic value actually measured to a specific value, which allows a classification to a specific error profile. An alarm threshold is defined within these values, for example lying at the value 6. During the standard measurement 28, the specific measured variable which has been measured and is tailor-made for the respective measuring point 16, for example the frequency spectrum, is assigned to this measured variable for the individual characteristic values, that is to say the significance of the measured standard signal is determined in a next working step 30. If, for example, a classification to the value 4 takes place, this classification, in relation to the measuring point 16 applicable at that particular time, is stored in the measuring apparatus 12 and the route patroller 22 is visually and/or acoustically inrructed on the measuring apparatus 12 to go to the next measuring point 16 of the route. Since the assumed significance 4 of the standard measuring signal which has been measured lies below the significance 6, stated by way of example and representing the alarm threshold, it can be assumed that in the unit 14 assigned to this measuring point 16 there is no damage requiring a more detailed inspection.

If the comparison 30 has shown that the significance of the standard measuring signal measured lies above the defined alarm threshold (in the example mentioned the standard measuring signal has for example a significance of 8), it is indicated to the route patroller 22 via the measuring apparatus 12 that at least one signal measurement has to be carried out at this measuring point 16 in a next working step 32. As signal measurements, specific signal measurements tailor-made for the respective measuring point 16 have been input to the measuring apparatus 12 via the central processing unit 10 within the route. Possible signal measurements are, for example, frequency spectra, timing signals, demodulation spectra or distribution densities. The measurement results of this at least one signal measurement are stored in the measuring apparatus 12 in specific relation to the measuring point 16 applicable at that time. At the same time, depending on how the first signal measurement has proceeded, or as specified by the central processing unit 10, a further signal measurement can take place over the stored route in a further step 34. After completion of the required, at least one, signal measurement at the measuring point 16, it is visually and/or acoustically indicated to the route patroller 22 on the measuring apparatus 12 that he can go to the next measuring point 16 of the route.

The transition from the standard measurement at step 30 to the at least one signal measurement 32, 34 is initiated by a registrable event. This registrable event is, as already explained, either initiated by the exceeding of a threshold value within various stages/categories of the standard measurement or else, according to a further exemplary embodiment, the registrable event may be initiated by the route patroller 22 himself. This is possible, for example, whenever the standard measurement does not exceed the predefined threshold value, but the route patroller 22 can assume from observations that a closer inspection of a unit 14 is necessary or advisable. Furthermore, the registrable event may be initiated if a comparison of the value for the standard measurement measured at a given time shows a considerable percentage deviation with respect to a value for the standard measurement measured in the case of a previous route for the same measuring point 16. If, for example, in the case of the previous measurement a significance of 1 was registered during the standard measurement, while now a significance of 5 is registered, not yet exceeding the assumed threshold value 6 but signifying a considerable deterioration, this may also be used as a registrable event for initiating the at least one signal measurement.

If there is a great deviation in the significance of the standard measurement results with respect to the standard measurement results of the previous route, it may initially be provided, if appropriate, to repeat the standard measurement, without extending straight away to the at least one signal measurement 32, 34. The repetition of the standard measuring task consequently represents the extended measuring task, the actual extended measuring task (signal measurement) being automatically displayed and carried out only after renewed occurrence of the registrable event.

According to a further exemplary embodiment, it is provided that, in the data transmission from the central processing unit 10 into the measuring apparatus 12, not only the data transmitted for the actual route of the measuring points 16 are transmitted but also further data, relating to any other measuring points 16 known in the central processing unit. These may be, for example, the measuring points 16 which are missing from the total number of measuring points 16 and are specifically not to be processed on the route. As a result, a pool is created in the background in the measuring apparatus 12 and can be used if need be by the route patroller 22 when carrying out his route. This makes it possible for the route patroller 22 to carry out measurements at a measuring point 16 which is not in fact envisaged for the route applicable at that particular time but is known in the central processing unit. This is helpful if an inspection appears to be necessary or advisable from observations by the route patroller 22 at the unit 14 assigned to the measuring point 16. Since the measuring points 16 of a route may generally be spread over relatively great distances, for example factory buildings etc., an additional measuring point 16 can be included in the intended route in a simple way. The measuring procedure for a measuring point 16 represented in FIG. 2 is then in turn performed at the additional measuring point 16. The assignment of the additional measuring point 16 to the route may take place either by means of an identification number which can be input or by means of an automatic measuring location identification.

According to a further exemplary embodiment, it may be provided that the registrable event is the input of an event code which is stored in the measuring apparatus and can be selected by the route patroller from a list of prescribed events. As a result, the route patroller can store observations by selecting an event code assigned to his observation and using this code to initiate switching over to the extended measuring task, that is to say to the at least one signal measurement. What is more, the registrable event may be the storing of a comment by the route patroller in the measuring apparatus, with respect to the measuring point at that time, so that switching over to the at least one extended measuring task likewise takes place on the basis of an observation which cannot be assigned to any actual event code previously stored.

Furthermore, it may be provided, as indicated in FIG. 2 by a working step 36, that along with the standard measurement of the one standard measured variable there is also measured a second standard measured variable, for example a rotational speed, which influences the standard measured variable originally to be measured. As a result, the classification to the significances, for example from 0 to 9, of the standard measured variable which has been measured can be verified, since certain influences, for example a severity of machine vibration, which bring an influence to bear on the standard measured variable actually measured can be assessed in step 36 by means of the additional standard measured variable measured. Thus, for example, in spite of the assumed alarm threshold 6 being exceeded by the standard measured variable, switching over to signal measurement can be blocked, since it is diagnosed by means of the second standard measured variable 36 also measured that the first standard measured variable brings to bear an influence which does not originate from any damage to the unit 14 inspected. Consequently, an influencing measured variable records a measurable influence on the actual individual characteristic value varying under the influence. By means of a measured and stored calibration function, the measured individual characteristic values are converted to a fixed reference value, for example a severity of machine vibration at 1475 revolutions per minute, in order that they can be compared in the measuring apparatus with simple threshold values.

The functional possibilities for processing the standard measurement and the at least one signal measurement provide a great overall variety of evaluation possibilities within the route, altogether producing a considerable simplification. The volumes of data to be processed and to be stored are reduced to the absolute minimum, without adversely affecting the quality of the monitoring of the units excited by oscillations. By means of the measurement results of the measurements assigned to the individual measuring points 16, transmitted from the measuring apparatus 12 into the central processing unit 10 after completion of the route, a registered or presumed deterioration in the state of individual units 14, having the measuring points 16, can be presented for evaluation and made immediately available by evaluation and/or display means, for example a printer, screen etc. This evaluation may comprise, for example, trend analyses over a long operating time of the units 14 on the basis ofthe standard measurement results and/or actual signal analyses over the time and frequency characteristic on the basis of the signal measurement results. The measures possibly to be instigated, for example shutdown, repair and/or exchange of individual units 14, can be planned or instigated immediately.

Furthermore, it may be provided that free measuring tasks with stored threshold values or setpoint deviations are also carried out outside routes and the pool individually by the person carrying out the measurements on the measuring apparatus, in which tasks the link to an extended measuring task after a registrable event can be used if it has been stored for the standard measuring task. Then, after the route, an assignment to measuring points can be performed subsequently in the central processing unit.

In this way the system can be optimized to the extent that the measurement result of the at least one standard measuring task forms a registrable event which is linked with at least one further registrable event, for example one of the possibilities for registrable events described above, and, on the basis of Boolean equations, forms a further registrable event for the initiation of a further extended measuring task.

What is claimed is:

1. A system for monitoring a vibrating machine, said system comprising:
    a central processing unit having a data storage subunit and a data evaluation subunit, said storage subunit having stored therein:
    a route containing at least one standard measuring task to be performed in a prescribable time period and order at selectable ones of a plurality of prescribable measuring points on said machine; and
    an extended measuring task to be performed upon the occurrence of a prescribed event at a measuring point on said machine; and
    a transportable measuring apparatus capable of communicating with said central processing unit, said transportable measuring apparatus having means for:
    receiving said route including sad standard measuring task and said extended measuring task for said selected measuring points on said machine,
    for displaying and performing said standard measuring task at said selected measuring points in accordance with the prescribed time period and order of the route received from the central processing unit,
    for automatically displaying and performing said extended measuring task in response to occurrence of the prescribed predctcmmed event during execution of said standard measuring task,
    for storing data obtained from performance of the measuring tasks, and
    for transmitting measurement data obtained during performance of said measuring tasks with said transportable measuring apparatus to said central procesiig unit for evaluation therein by said evaluation subunit.

2. The system of claim 1, wherein said standard measuring task includes a predetermined time period within which it is to be executed and predetermined time limits of additional standard measuring tasks for other measuring points on said vibrating machine.

3. The system of claim 1, wherein said transportable measuring apparatus is adapted to communicate measurements obtained during said at least one of said standard measuring task and said extended measuring task.

4. The system of claim 1, wherein said central processing unit includes display means for displaying results of evaluations performed by said evaluation and measurements obtained by said transportable measuring apparatus.

5. The system of claim 1, wherein said standard measuring task includes measuring a predetermined characteristic of said machine.

6. The system of claim 5, wherein said standard measuring task includes an error threshold for each of a plurality of error categories of said predetermined characteristic, wherein said transportable measuring apparatus is adapted to combine each measured characteristic that exceeds said error threshold for said corresponding error category.

7. The system of claim 1, wherein said extended measuring task comprises a repeat of said standard measuring task, wherein said transportable measuring apparatus comprises a display that is capable of displaying said extended measuring task.

8. The system of claim 1, wherein said predetermined event comprises a selectable error categorization of said measurements obtained during said standard measuring task.

9. The system of claim 1, wherein said predetermined event comprises input received from an operator of said transportable measuring apparartus.

10. The system of claim 9, wherein said input comprises an event code which is stored in said transportable measuring apparatus, is assigned to the measurements obtained during said standard measuring task and which comprises one of a plurality of selectable event codes.

11. The system of claim 9, wherein said input comprises a comment being stored in said transportable measuring apparatus and which is assigned to the measurements obtained during said standard measuring task.

12. The system of claim 1, wherein said predetermined event comprises a measurement that exceeds a predetermined deviation from a measurement obtained during execution of a previous standard measuring task.

13. The system of claim 1, wherein said extended measuring task comprises measuring one of a frequency characteristic and a time characteristic of a measurement taken during the execution of said standard measuring task.

14. The system of claim 1, wherein at least one of said standard measuring task and said extended measuring task is based upon the type of said machine.

15. The system of claim 1, wherein said transportable measuring apparatus is further capable of communicating with said central processing unit for receiving at least one additional standard measuring task and at least one additional extended measuring task and wherein said additional standard measuring task and said at least one additional extended measuring task forms a pool.

16. The system of claim 1, wherein said transportable measuring apparatus is further capable of communicating with said central processing unit for receiving at least one additional standard measuring task that will attempt to verify a measurement obtained during execution of said original standard measuring task.

17. The system of claim 1, wherein said transportable measuring apparatus is further capable of communicating with said central processing unit for receiving at least one free standard measuring task and at least one corresponding extended measuring task that are not assigned to a measuring point and wherein said central processing unit is adapted to assign a measuring point to said at least one free standard measuring task and at least one corresponding extended measuring task.

18. The system of claim 1, wherein said transportable measuring apparatus is capable of communicating with said central processing unit for receiving another extended measuring task, wherein said transportable measuring apparatus is responsive to a second predetermined event during execution of said extended measuring task to prompt execution of said another extended measuring task.

19. The system of claim 1, wherein said second predetermined event includes a predetermined relationship between a measurement obtained during said standard measuring task and a measurement obtained during said extended measuring task.

20. The system of claim 1, wherein said standard measuring task is a measurement of a level of a single frequency band and wherein said extended measuring task is a measurement of a complete frequency characteristic.

21. The system of claim 1, wherein said route comprises a plurality of standard measuring tasks and wherein said transportable measuring apparatus is responsive to the non-occurrence of said predetermined event to skip at least one of said plurality of standard measuring tasks in said route.

22. The system of claim 1, wherein said standard measuring task includes taking measurements at one of a plurality of measuring points on said machine and wherein said extended measuring task includes taking meauements at another of said plurality of measuring points.

* * * * *